United States Patent
Suemori et al.

(10) Patent No.: US 9,896,755 B2
(45) Date of Patent: Feb. 20, 2018

(54) METHOD AND DEVICE FOR CONTROLLING AMOUNT OF HOT DIP GALVANIZATION ADHESION

(71) Applicants: PRIMETALS TECHNOLOGIES JAPAN, LTD., Tokyo (JP); NISSHIN STEEL CO., LTD., Tokyo (JP)

(72) Inventors: Hideaki Suemori, Hiroshima (JP); Masayoshi Tanaka, Hiroshima (JP); Norikatsu Kakemizu, Hiroshima (JP); Takashi Yamamoto, Saijo (JP); Hisao Morishita, Saijo (JP); Ryuuichi Yamashita, Saijo (JP)

(73) Assignees: PRIMETALS TECHNOLOGIES JAPAN, LTD., Tokyo (JP); NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/117,612

(22) PCT Filed: Feb. 10, 2015

(86) PCT No.: PCT/JP2015/053575
§ 371 (c)(1),
(2) Date: Aug. 9, 2016

(87) PCT Pub. No.: WO2015/119286
PCT Pub. Date: Aug. 13, 2015

(65) Prior Publication Data
US 2016/0355919 A1   Dec. 8, 2016

(30) Foreign Application Priority Data
Feb. 10, 2014   (JP) ................................ 2014-023019

(51) Int. Cl.
*C23C 2/20* (2006.01)
*C23C 2/14* (2006.01)
(Continued)

(52) U.S. Cl.
CPC ............... *C23C 2/20* (2013.01); *C23C 2/003* (2013.01); *C23C 2/14* (2013.01); *C23C 2/16* (2013.01); *G05D 5/03* (2013.01)

(58) Field of Classification Search
None
See application file for complete search history.

(56) References Cited

U.S. PATENT DOCUMENTS

| | | | | | |
|---|---|---|---|---|---|
| 4,135,006 A | * | 1/1979 | Readal | ...................... | C23C 2/18 118/665 |
| 5,518,772 A | * | 5/1996 | Andachi | ................... | C23C 2/20 427/348 |

FOREIGN PATENT DOCUMENTS

| | | |
|---|---|---|
| JP | 5-1358 A | 1/1993 |
| JP | 10-273765 A | 10/1998 |

(Continued)

OTHER PUBLICATIONS

Control Valve Flow Characteristics from website: http://www.engineeringtoolbox.com/controlvalvesflowcharacteristicsd_485.html.*

(Continued)

*Primary Examiner* — Binu Thomas
(74) *Attorney, Agent, or Firm* — Birch, Stewart, Kolasch & Birch, LLP

(57) ABSTRACT

The present invention is provided with: a duct of which one end interconnects to a wiping nozzle (22, 23) and the other end is open; a first valve (17) that controls the actual gas pressure (P1') of the wiping nozzle (22, 23); a second valve (18) that controls the gas flow rate (Q2) dissipating to outside the system from another branched duct; a wiping pressure setting unit (11) that sets the set gas pressure (P1) of the wiping nozzle (22, 23); a first valve aperture setter (13) that sets the valve aperture of the first valve (17); a second valve aperture setter (14) that sets the valve aperture (Continued)

of the second valve (18); and a computation processing unit (12) that presents to the first valve aperture setter (13) the valve aperture at which the gas pressure (P1') matches a set gas pressure (P1), and presents to the second valve aperture setter (14) the valve aperture at which the total gas flow rate (QT) supplied from a gas supply device (15) becomes uniform.

12 Claims, 11 Drawing Sheets

(51) Int. Cl.
  *C23C 2/16* (2006.01)
  *G05D 5/03* (2006.01)
  *C23C 2/00* (2006.01)

(56) References Cited

FOREIGN PATENT DOCUMENTS

| JP | 2003-129207 A | 5/2003 |
| JP | 2004-339540 A | 12/2004 |
| JP | 2008-133507 A | 6/2008 |

OTHER PUBLICATIONS

Extended European Search Report dated Jul. 31, 2017 issued in corresponding European Application No. 15746290.4.

\* cited by examiner

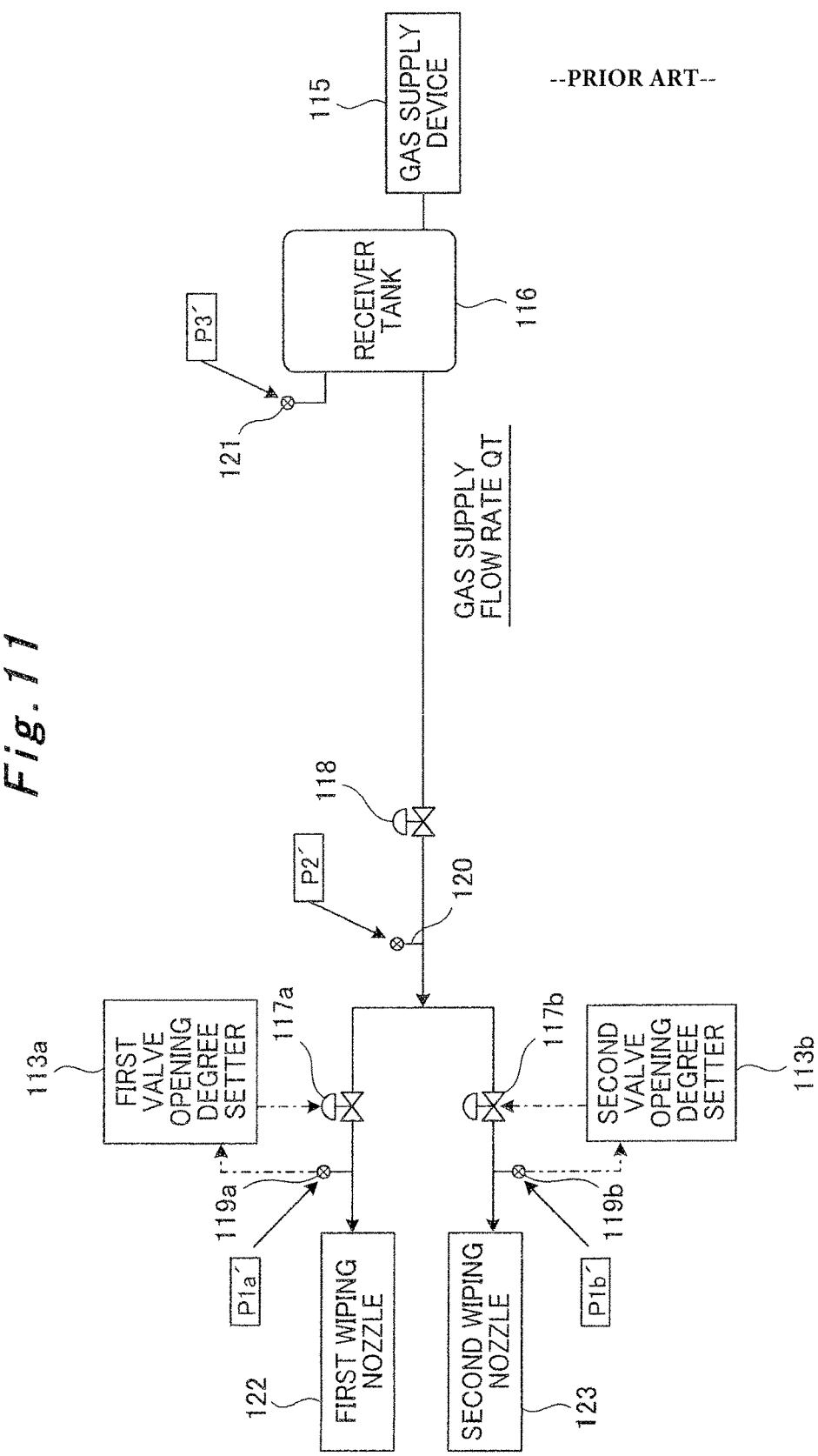

METHOD AND DEVICE FOR CONTROLLING AMOUNT OF HOT DIP GALVANIZATION ADHESION

CROSS-REFERENCE TO RELATED APPLICATIONS

This application is the National Phase of PCT International Application No. PCT/JP2015/053575, filed on Feb. 10, 2015, which claims priority under 35 U.S.C. 119(a) to Patent Application No. 2014-023019, filed in Japan on Feb. 10, 2014, all of which are hereby expressly incorporated by reference into the present application.

TECHNICAL FIELD

The present invention relates to a device and method for controlling an amount of hot dip galvanization adhesion.

BACKGROUND ART

A conventional device for controlling an amount of hot dip galvanization adhesion controls the amount of hot dip galvanization adhesion by spraying gas from a wiping nozzle onto a steel plate to which molten metal adheres. Such a device is devised such that a pressure control valve and an opening control valve are arranged in series to increase a response speed of a spraying amount of this gas.

FIG. 11 is a schematic view explaining the conventional device for controlling the amount of hot dip galvanization adhesion. As illustrated in FIG. 11, the conventional device for controlling the amount of hot dip galvanization adhesion includes a first valve opening degree setter 113a, a second valve opening degree setter 113b, a gas supply device 115, a receiver tank 116, a first pressure control valve 117a, a second pressure control valve 117b, an opening control valve 118, a first a pressure gauge 119a, a first b pressure gauge 119b, a second pressure gauge 120, a third pressure gauge 121, a first wiping nozzle 122, and a second wiping nozzle 123. Note that the solid-line arrows in the FIG. 11 indicate a duct through which the gas flows.

The first wiping nozzle 122 and the second wiping nozzle 123 communicate with the gas supply device 115 via the duct and spray the gas supplied from the gas supply device 115 respectively onto front and back sides of the steel plate to which the molten metal adheres.

The receiver tank 116 is installed in the duct downstream of the gas supply device 115, and has a diameter greater than that of the duct. Moreover, the third pressure gauge 121 measures a gas pressure (that is a pressure of the gas supplied from the gas supply device 115) P3' inside the receiver tank 116.

The opening control valve 118 is installed in the duct downstream of the gas supply device 115 and the receiver tank 116 and controls the opening degree of the duct. The second pressure gauge 120 is installed downstream of the opening control valve 118 and measures a gas pressure P2' in the duct.

Note that the duct branches in two directions downstream of the second pressure gauge 120, and branched portions of the duct communicate respectively with the first wiping nozzle 122 and the second wiping nozzle 123.

The first pressure control valve 117a and the second pressure control valve 117b are pressure control valves installed respectively in the branched portions of the duct, upstream of the first wiping nozzle 122 and the second wiping nozzle 123. A positional relationship between the opening control valve 118 and the first pressure control valve 117a and a positional relationship between the opening control valve 118 and the second pressure control valve 117b are referred to as arranged in series.

The first a pressure gauge 119a measures a gas pressure in the duct between the first pressure control valve 117a and the first wiping nozzle 122, that is a gas pressure P1a' of the first wiping nozzle 122. The first b pressure gauge 119b measures a gas pressure in the duct between the second pressure control valve 117b and the second wiping nozzle 123, that is a gas pressure P1b' of the second wiping nozzle 123.

The first valve opening degree setter 113a performs feedback control (one-dot chain line arrows in FIG. 11) of the first pressure control valve 117a, based on a measurement result of the first a pressure gauge 119a, such that the gas pressure P1a' becomes equal to a set gas pressure P1a. Meanwhile, the second valve opening degree setter 113b performs feedback control (one-dot chain line arrows in FIG. 11) of the second pressure control valve 117b, based on a measurement result of the first b pressure gauge 119b, such that the gas pressure P1b' becomes equal to a set gas pressure P1b. Note that P1a=P1b is normally satisfied in most cases.

PRIOR ART DOCUMENT

Patent Document

Patent Document 1: Japanese Patent Application Publication No. Hei 5-1358
Patent Document 2: Japanese Patent Application Publication No. 2004-339540

SUMMARY OF THE INVENTION

Problems to be Solved by the Invention

In the aforementioned conventional device for controlling the amount of hot dip galvanization adhesion (Patent Document 1 listed above), since a gas supply rate QT changes in the duct upstream of the opening control valve, the response speed and accuracy of control of the gas pressures P1a' and P1b' cannot be sufficiently increased. Specifically, when the gas pressures P1a' and P1b' are controlled at high values (when the opening control valve 118 tends to be set on the open side in the valve opening degree), the sensitivities of the pressure control valves 117a, 117b are high and highly accurate control is difficult. Meanwhile, when the gas pressures P1a' and P1b' are controlled at low values (when the opening control valve 118 tends to be set on the closed side in the valve opening degree), the pressure control valves 117a, 117b are in a state where the sensitivities thereof are low, that is the adjustment amounts thereof are great, and opening degree operation time increases, thereby causing a decrease in the response speed.

The conventional device for controlling the amount of hot dip galvanization adhesion thus cannot sufficiently control the amount of gas sprayed from the first wiping nozzle 122 and the second wiping nozzle 123. Hence, variation in amount of hot dip galvanization adhesion is great. Moreover, operations such as changing the amount of hot dip galvanization adhesion take long time.

Patent Document 2 discloses a technique of improving accuracy of gas pressure control by installing a diffusion valve used to diffuse the gas from the receiver tank of the conventional device for controlling the amount of hot dip galvanization adhesion to the outside of the system and by performing feedback control for the valves. However, the response speed of the gas pressure control cannot be increased by this technique.

In view of this, an object of the present invention is to provide a device and method for controlling an amount of hot dip galvanization adhesion which achieve control accuracy high enough to reduce variation in the amount of galvanization adhesion and a response performance fast enough to complete change of the amount of galvanization adhesion in short time.

Means for Solving the Problems

A device for controlling an amount of hot dip galvanization adhesion according to a first aspect of the present invention for solving the problems described above is characterized in that the device comprises:
  a nozzle communicating with a gas supply device via a duct and configured to spray gas supplied from the gas supply device onto a steel plate to which molten metal adherers;
  the duct branching in two directions and having one branched portion communicating with the nozzle and another branched portion being open;
  a first valve configured to control an actual gas pressure P1' of the nozzle;
  a second valve configured to control a gas flow rate Q2 of the gas to be diffused from the other branched portion of the duct to an outside of a system;
  a pressure setting unit configured to set a set gas pressure P1 of the nozzle;
  a first valve opening degree setter configured to set a valve opening degree MV1 of the first valve, based on an instruction from a computation processing unit;
  a second valve opening degree setter configured to set a valve opening degree MV2 of the second valve, based on an instruction from the computation processing unit;
  the computation processing unit configured to obtain the valve opening degree MV1 at which the gas pressure P1' becomes equal to the set gas pressure P1, and instruct the first valve opening degree setter about the obtained valve opening degree MV1, the computation processing unit configured to obtain the valve opening degree MV2 at which a total gas flow rate QT of the gas supplied from the gas supply device is constant, and instruct the second valve opening degree setter about the obtained valve opening degree MV2.

A device for controlling an amount of hot dip galvanization adhesion according to a second aspect of the present invention for solving the problems described above is the device for controlling an amount of hot dip galvanization adhesion according to the first aspect characterized in that the computation processing unit:
  calculates a CV coefficient CV1 of the first valve from the set gas pressure P1, an actual gas pressure P3' supplied from the gas supply device, and a pressure loss coefficient of the nozzle;
  calculates the valve opening degree MV1 from the CV coefficient CV1 and a characteristic function unique to the first valve;
  calculates the gas flow rate Q1 from the set gas pressure P1 and the pressure loss coefficient;
  calculates the gas flow rate Q2 from the gas flow rate Q1 and the total gas flow rate QT determined in advance from an ability of the gas supply device;
  calculates a CV coefficient CV2 of the second valve from the gas flow rate Q2 and the gas pressure P3'; and
  calculates the valve opening degree MV2 from the CV coefficient CV2 and a characteristic function unique to the second valve.

A device for controlling an amount of hot dip galvanization adhesion according to a third aspect of the present invention for solving the problems described above is the device for controlling an amount of hot dip galvanization adhesion according to the first aspect characterized in that the computation processing unit has a table indicating relationships between the set gas pressure P1 and each of the valve opening degree MV1 and the valve opening degree MV2, and obtains the valve opening degree MV1 and the valve opening degree MV2 based on the table.

A device for controlling an amount of hot dip galvanization adhesion according to a fourth aspect of the present invention for solving the problems described above is the device for controlling an amount of hot dip galvanization adhesion according to the first aspect characterized in that
  the nozzle includes a first nozzle and a second nozzle,
  the first valve includes a first a valve configured to control an actual gas pressure P1a' of the first nozzle and a first b valve configured to control an actual gas pressure P1b' of the second nozzle,
  the first valve opening degree setter includes a first a valve opening degree setter configured to set a valve opening degree MV1a of the first a valve and a first b valve opening degree setter configured to set a valve opening degree MV1b of the first b valve, and
  the computation processing unit:
    obtains the valve opening degree MV1a and the valve opening degree MV1b at which the gas pressure P1a' and the gas pressure P1b' become equal to the set gas pressure P1, and instructs the first a valve opening degree setter and the first b valve opening degree setter about the obtained valve opening degree MV1a and the obtained valve opening degree MV1b; and
    obtains the valve opening degree MV2 at which the total gas flow rate QT is constant, and instructs the second valve opening degree setter about the obtained valve opening degree MV2.

A device for controlling an amount of hot dip galvanization adhesion according to a fifth aspect of the present invention for solving the problems described above is the device for controlling an amount of hot dip galvanization adhesion according to the fourth aspect characterized in that the computation processing unit:
  calculates a CV coefficient CV1a of the first a valve and a CV coefficient CV1b of the first b valve from the set gas pressure P1, an actual gas pressure P3' supplied from the gas supply device, and a pressure loss coefficient of the nozzle;
  calculates the valve opening degree MV1a from the CV coefficient CV1a and a characteristic function unique to the first a valve and calculates the valve opening degree MV1b from the CV coefficient CV1b and a characteristic function unique to the first b valve;
  calculates the gas flow rate Q1 from the set gas pressure P1 and the pressure loss coefficient;
  calculates the gas flow rate Q2 from the gas flow rate Q1 and the total gas flow rate QT determined in advance from an ability of the gas supply device;
  calculates a CV coefficient CV2 of the second valve from the gas flow rate Q2 and the gas pressure P3'; and
  calculates the valve opening degree MV2 from the CV coefficient CV2 and a characteristic function unique to the second valve.

A device for controlling an amount of hot dip galvanization adhesion according to a sixth aspect of the present invention for solving the problems described above is the device for controlling an amount of hot dip galvanization adhesion according to any one of the first to third aspects characterized in that the device further comprises a pressure controller configured to calculate a valve opening degree correction value C1 from a difference between the set gas pressure P1 and the actual gas pressure P1' of the nozzle and perform control to add the valve opening degree correction value C1 to the valve opening degree MV1 set by the first valve opening degree setter.

A device for controlling an amount of hot dip galvanization adhesion according to a seventh aspect of the present invention for solving the problems described above is the device for controlling an amount of hot dip galvanization adhesion according to the fourth or fifth aspect characterized in that the device further comprises:
- a first pressure controller configured to calculate a valve opening degree correction value C1$a$ from a difference between the set gas pressure P1 and the actual gas pressure P1$a$' of the nozzle and perform control to add the valve opening degree correction value C1$a$ to the valve opening degree MV1$a$ set by the first a valve opening degree setter; and
- a second pressure controller configured to calculate a valve opening degree correction value C1$b$ from a difference between the set gas pressure P1 and the actual gas pressure P1$b$' of the nozzle and perform control to add the valve opening degree correction value C1$b$ to the valve opening degree MV1$b$ set by the first b valve opening degree setter.

A device for controlling an amount of hot dip galvanization adhesion according to an eighth aspect of the present invention for solving the problems described above is the device for controlling an amount of hot dip galvanization adhesion according to the fourth aspect characterized in that
the pressure setting unit includes a first pressure setting unit configured to set a set gas pressure P1$a$ of the first nozzle and a second pressure setting unit configured to set a set gas pressure P1$b$ of the second nozzle,
the computation processing unit:
- obtains the valve opening degree MV1$a$ and the valve opening degree MV1$b$ at which the gas pressure P1$a$' and the gas pressure P1$b$' become equal to the set gas pressure P1$a$, and instructs the first a valve opening degree setter and the first b valve opening degree setter about the obtained valve opening degree MV1$a$ and the obtained valve opening degree MV1$b$; and
- obtains the valve opening degree MV2 at which the total gas flow rate QT is constant, and instructs the second valve opening degree setter about the obtained valve opening degree MV2, and the device further comprises:
- a first pressure controller configured to calculate a valve opening degree correction value C1$a$ from a difference between the set gas pressure P1$a$ and the actual gas pressure P1$a$' of the nozzle and perform control to add the valve opening degree correction value C1$a$ to the valve opening degree MV1$a$ set by the first a valve opening degree setter; and
- a second pressure controller configured to calculate a valve opening degree correction value C1$b$ from a difference between a pressure difference $\Delta P$ and a pressure difference $\Delta P'$ and perform control to add the valve opening degree correction value C1$b$ to the valve opening degree MV1$b$, the pressure difference $\Delta P$ being a difference between the set gas pressure P1$a$ and the set gas pressure P1$b$, the pressure difference $\Delta P'$ being a difference between the gas pressure P1$a$' and the gas pressure P1$b$'.

A method for controlling an amount of hot dip galvanization adhesion according to a ninth aspect of the present invention for solving the problems described above is characterized in that the method comprises the steps of:
- spraying gas supplied from a gas supply device onto a steel plate to which molten metal adheres, by using a first nozzle and a second nozzle which communicate with the gas supply device via a duct;
- controlling an actual gas pressure P1$a$' of the first nozzle by using a first a valve and controlling an actual gas pressure P1$b$' of the second nozzle by using a first b valve;
- with the duct branching in two directions and having one branched portion communicating with the first nozzle and the second nozzle and another branched portion being open, controlling a gas flow rate Q2 of the gas diffused from the other branched portion of the duct to an outside of a system;
- setting a set gas pressure P1$a$ of the first nozzle;
- setting a set gas pressure P1$b$ of the second nozzle;
- setting a valve opening degree MV1$a$ of the first a valve such that the gas pressure P1$a$' becomes equal to the set gas pressure P1$a$, setting a valve opening degree MV1$b$ of the first b valve such that the gas pressure P1$b$' becomes equal to the set gas pressure P1$b$, and setting a valve opening degree MV2 of the second valve such that the total gas flow rate QT is constant;
- calculating a valve opening degree correction value C1$a$ from a difference between the set gas pressure P1$a$ and the gas pressure P1$a$' and performing control to add the valve opening degree correction value C1$a$ to the valve opening degree MV1$a$; and
- calculating a valve opening degree correction value C1$b$ from a difference between a pressure difference $\Delta P$ and a pressure difference $\Delta P'$ and performing control to add the valve opening degree correction value C1$b$ to the valve opening degree MV1$b$, the pressure difference $\Delta P$ being a difference between the set gas pressure P1$a$ and the set gas pressure P1$b$, the pressure difference $\Delta P'$ being a difference between the gas pressure P1$a$' and the gas pressure P1$b$'.

Effect of the Invention

The device and method for controlling the amount of hot dip galvanization adhesion of the present invention can achieve control accuracy high enough to reduce variation in the amount of galvanization adhesion and a response performance fast enough to complete change of the amount of galvanization adhesion in short time.

BRIEF DESCRIPTION OF THE DRAWINGS

FIG. 11 is a schematic view explaining a conventional device for controlling an amount of hot dip galvanization adhesion.

MODE FOR CARRYING OUT THE INVENTION

A device and method for controlling an amount of hot dip galvanization adhesion of the present invention are described below in Embodiments by using the drawings.

Embodiment 1

Figure 1:
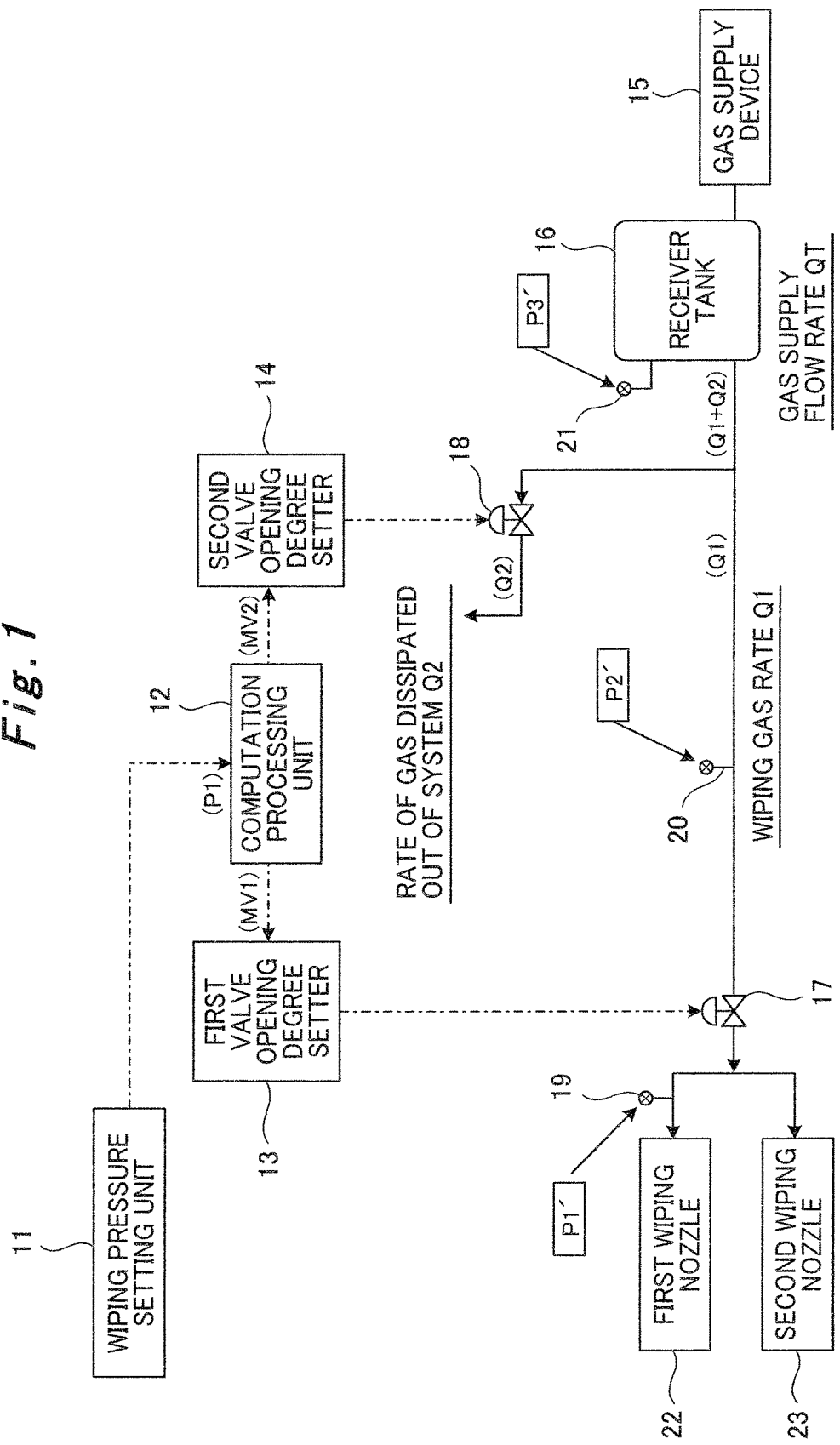
FIG. 1 is a schematic view explaining a device for controlling an amount of hot dip galvanization adhesion in Embodiment 1 of the present invention.
Figure 2:
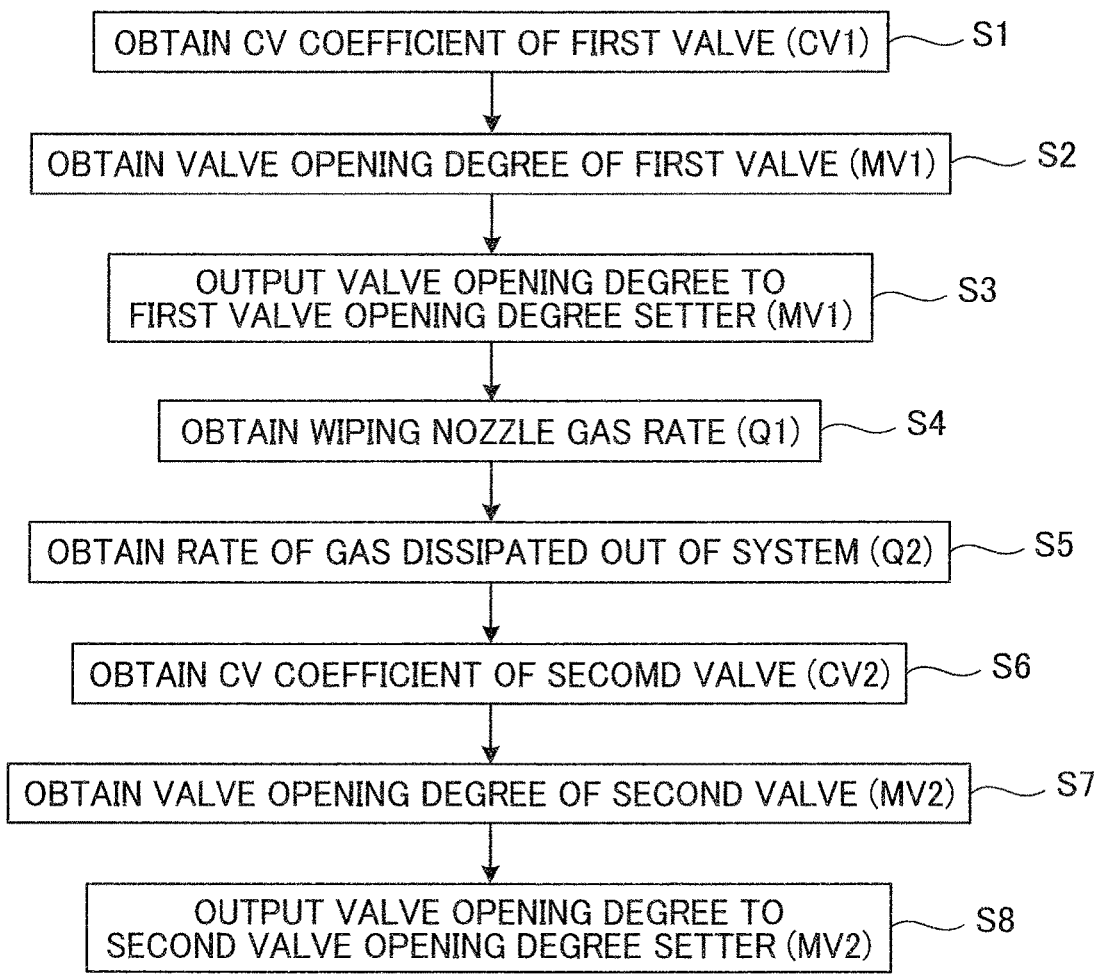
FIG. 2 is a flowchart explaining processing of a computation processing unit in Embodiment 1 of the present invention.

A device for controlling an amount of hot dip galvanization adhesion in Embodiment 1 of the present invention is described by using FIGS. 1 and 2. FIG. 1 is a schematic view explaining the device for controlling the amount of hot dip galvanization adhesion in Embodiment 1 of the present invention. FIG. 2 is a flowchart explaining processing of a computation processing unit in Embodiment 1 of the present invention.

As illustrated in FIG. 1, the device for controlling the amount of hot dip galvanization adhesion in Embodiment 1 of the present invention includes a wiping pressure setting unit 11, a computation processing unit 12, a first valve opening degree setter 13, a second valve opening degree setter 14, a gas supply device 15, a receiver tank 16, a first valve 17, a second valve 18, a first pressure gauge 19, a second pressure gauge 20, a third pressure gauge 21, a first wiping nozzle 22, and a second wiping nozzle 23. Note that the solid-line arrows in the drawing indicate a duct through which gas flows.

Since the gas supply device 15, the receiver tank 16, the first wiping nozzle 22, and the second wiping nozzle 23 in the device for controlling the amount of hot dip galvanization adhesion in Embodiment 1 of the present invention are the same as the gas supply device 115, the receiver tank 116, the first wiping nozzle 122, and the second wiping nozzle 123 in the already-described conventional device for controlling the amount of hot dip galvanization adhesion (FIG. 11), description thereof is omitted.

Note that, in the device for controlling the amount of hot dip galvanization adhesion in Embodiment 1 of the present invention, it is assumed that gas spraying amounts of the first wiping nozzle 22 and the second wiping nozzle 23 are equal and gas pressures thereof are equal.

As illustrated in FIG. 1, the duct in the device for controlling the amount of hot dip galvanization adhesion in Embodiment 1 of the present invention branches in two directions downstream of the receiver tank 16. One branched portion of the duct communicates with the first wiping nozzle 22 and the second wiping nozzle 23, and the other branched portion of the duct is open to discharge the gas out of the system. Note that the one branched portion of the duct further branches in two directions before reaching the first wiping nozzle 22 and the second wiping nozzle 23 and branched portions of the duct communicate respectively with the first wiping nozzle 22 and the second wiping nozzle 23.

The first valve 17 is installed in the aforementioned one branched portion of the duct downstream of the receiver tank 16, upstream of the first wiping nozzle 22 and the second wiping nozzle 23, and controls an actual gas pressure P1' of the wiping nozzles 22, 23.

The second valve 18 is installed in the aforementioned other branched portion of the duct downstream of the receiver tank 16, and controls a wiping gas flow rate Q2 of the gas to be diffused out of the system.

The first pressure gauge 19 measures an actual gas pressure in the duct between the first valve 17 and the first wiping nozzle 22 (or the second wiping nozzle 23), that is the actual pressure P1' of the wiping nozzles 22, 23.

The second pressure gauge 20 measures an actual gas pressure P2' in the aforementioned one branched portion of the duct, upstream of the first valve 17.

The third pressure gauge 21 measures an actual gas pressure (actual gas pressure inside the receiver tank 16) P3' supplied from the gas supply device 15.

Moreover, the wiping pressure setting unit 11 sets a set gas pressure in the duct between the first valve 17 and the first wiping nozzle 22, that is a set gas pressure P1 of the wiping nozzles 22, 23.

The computation processing unit 12 obtains a valve opening degree MV1 [%] of the first valve 17 at which the gas pressure P1' of the wiping nozzles 22, 23 becomes equal to the set gas pressure P1 set by the wiping pressure setting unit 11, and instructs the first valve opening degree setter 13 about the obtained valve opening degree MV1. Moreover, the computation processing unit 12 obtains a valve opening degree MV2 [%] of the second valve 18 at which the sum of a gas flow rate (wiping gas flow rate) Q1 of the gas supplied to the first wiping nozzle 22 and the second wiping nozzle 23 and the gas flow rate Q2 of the gas diffused from the second valve 18 to the outside of the system, that is a total gas flow rate QT of the gas supplied from the gas supply device 15 is constant, and instructs the second valve opening degree setter 14 about the obtained valve opening degree MV2. The valve opening degrees of the first valve 17 and the second valve 18 are thereby preset. Operations of the computation processing unit 12 are described below in detail in steps S1 to S8 of FIG. 2.

In step S1, a CV coefficient (resistance coefficient unique to the valve) of the first valve 17 is calculated based on the set gas pressure P1 set by the wiping pressure setting unit 11, by using the following formula (1):

$$CV1 = 2 \times Kv/((P3'-P1)^{1/2}/P1^{1/2}) \qquad (1)$$

where CV1 is the CV coefficient of the first valve 17 and Kv is a pressure loss coefficient of the wiping nozzles.

In steps S2 and S3, the valve opening degree MV1 [%] of the first valve 17 at which the gas pressure P1' becomes equal to the set gas pressure P1 is calculated by using the following formula (2) (empirical formula), and is outputted (instructed) to the first valve opening degree setter 13:

$$MV1 = \text{Function}_1[CV1] \qquad (2)$$

where, Function$_1$ is a characteristic function unique to the first valve 17.

In step S4, the wiping gas flow rate Q1 is calculated by using the following formula (3):

$$Q1 = 2 \times (Kv \times P1^{1/2}) \qquad (3).$$

In step S5, the gas flow rate Q2 of the gas diffused out of the system is calculated by using the following formula (4). Note that the total gas flow rate QT is a rate determined in advance from the ability of the gas supply device 15.

$$Q2 = QT - Q1 \qquad (4).$$

In step S6, a CV coefficient of the second valve 18 is calculated by using the following formula (5):

$$CV2 = Q2/P3'^{1/2} \qquad (5)$$

where CV2 is the CV coefficient of the second valve 18.

In steps S7 and S8, the valve opening degree MV2 [%] of the second valve 18 at which the total gas flow rate QT is constant is calculated by using the following formula (6) (empirical formula), and is outputted (instructed) to the second valve opening degree setter 14:

$$MV2 = \text{Function}_2[CV2] \qquad (6)$$

where, Function$_2$ is a characteristic function unique to the second valve 18.

These are the operations of the computation processing unit 12.

The first valve opening degree setter 13 sets the valve opening degree of the first valve 17, based on MV1 received from the computation processing unit 12. Moreover, the second valve opening degree setter 14 sets the valve opening degree of the second valve 18, based on MV2 received from the computation processing unit 12.

In the embodiment, the configuration may be such that no receiver tank 16 is installed and the third pressure gauge 21 directly measures the gas pressure P3' in the duct. This also applies to Embodiments 2 to 6 described below.

In the device for controlling the amount of hot dip galvanization adhesion in Embodiment 1 of the present invention which has the configuration described above, a state inside the duct upstream of the first valve 17 and the second valve 18 does not change. Accordingly, the gas supply device 15 is not disturbed. For example, since the total gas flow rate QT is constant, a PQ characteristic of a blower is not disturbed and disturbance due to gas diffusion control of a compressor does not occur. At the same time, the problem of delay in gas pressure change in an upstream pipe is also solved.

Accordingly, the device for controlling the amount of hot dip galvanization adhesion in Embodiment 1 of the present invention can achieve high-speed, highly-accurate response only by performing preset control for the first valve 17 and the second valve 18, without performing feedback control. As a result, change of the valve opening degree of the first valve 17 can follow the nozzle pressure being a control target, without time delay.

Embodiment 2

A device for controlling an amount of hot dip galvanization adhesion in Embodiment 2 of the present invention has a configuration partially changed from the configuration of the device for controlling the amount of hot dip galvanization adhesion in Embodiment 1, and valve opening degrees of a first valve 17 and a second valve 18 are controlled by using a table indicating relationships between a set gas pressure P1 and the valve opening degree of each of the first valve 17 and the second valve 18.

Figure 3:
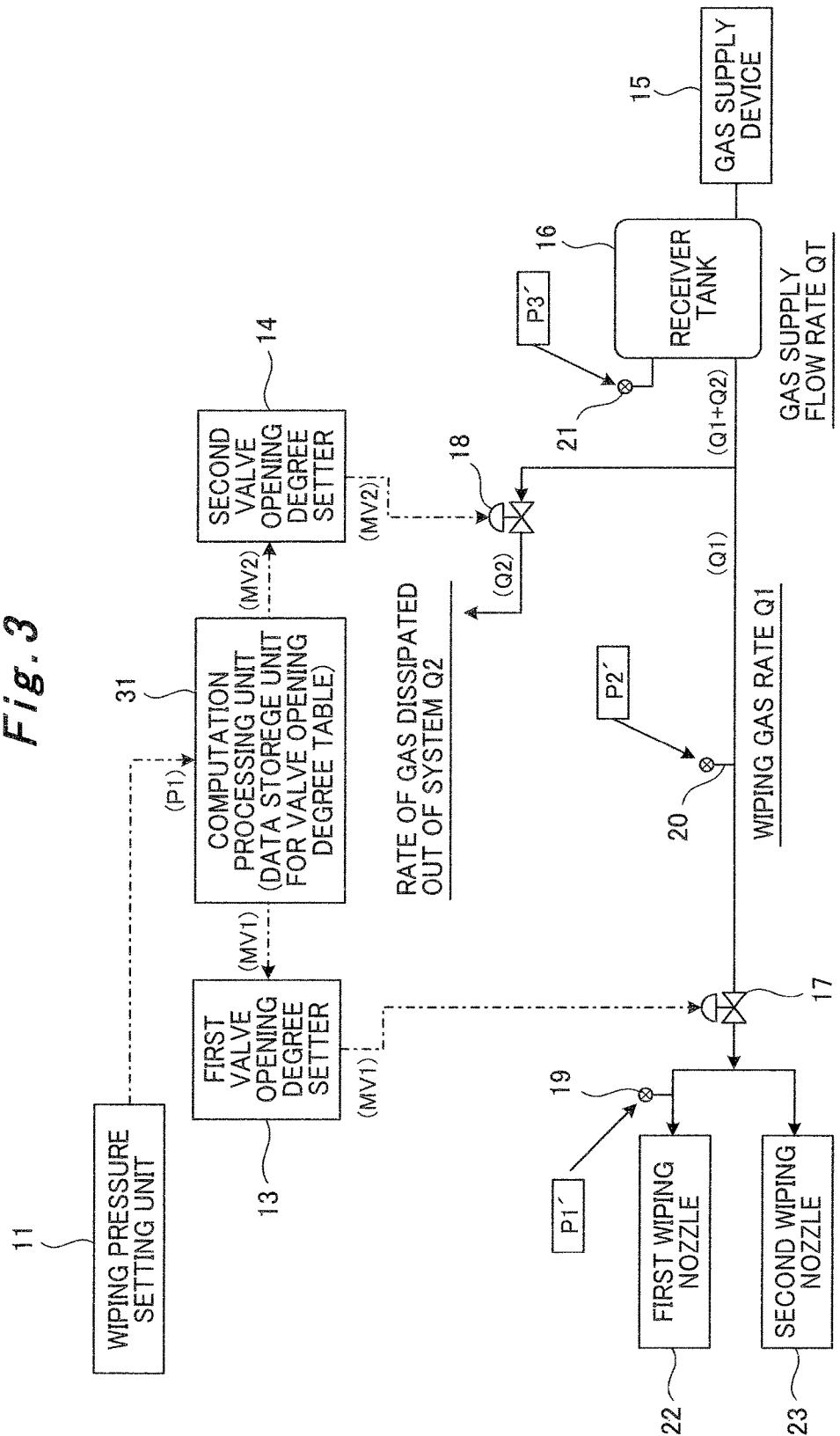
FIG. 3 is a schematic view explaining a device for controlling an amount of hot dip galvanization adhesion in Embodiment 2 of the present invention.
Figure 4A:
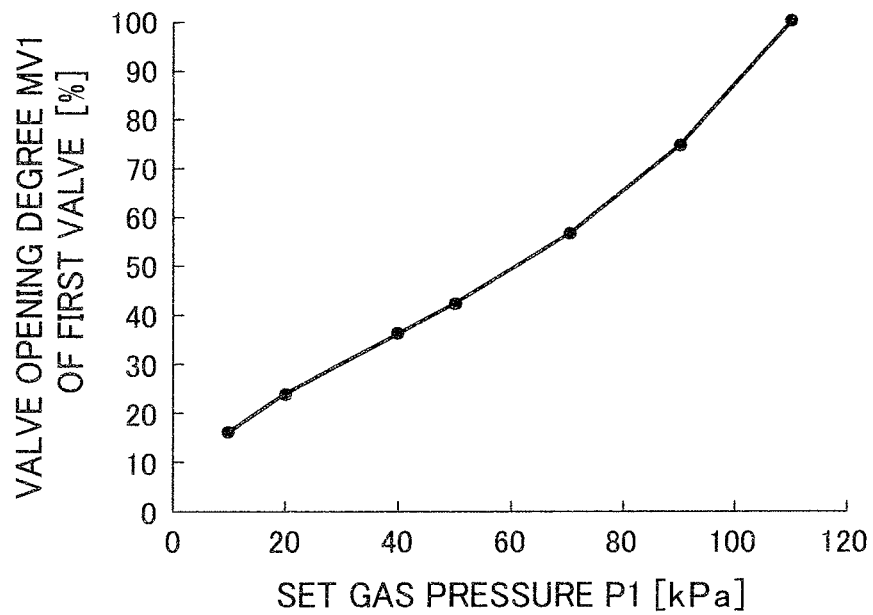
FIG. 4 includes graphs of an example of a table which is included in a computation processing unit in Embodiment 2 of the present invention and which depicts relationships between a set gas pressure and a valve opening degree of each of a first valve and a second valve. Part (a) of FIG. 4 is a graph depicting relationships between the set gas pressure P1 and the valve opening degree MV1 [%] of the first valve, and part (b) of FIG. 4 is a graph depicting relationships between the set gas pressure P1 and the valve opening degree MV2 [%] of the second valve.
Figure 4B:
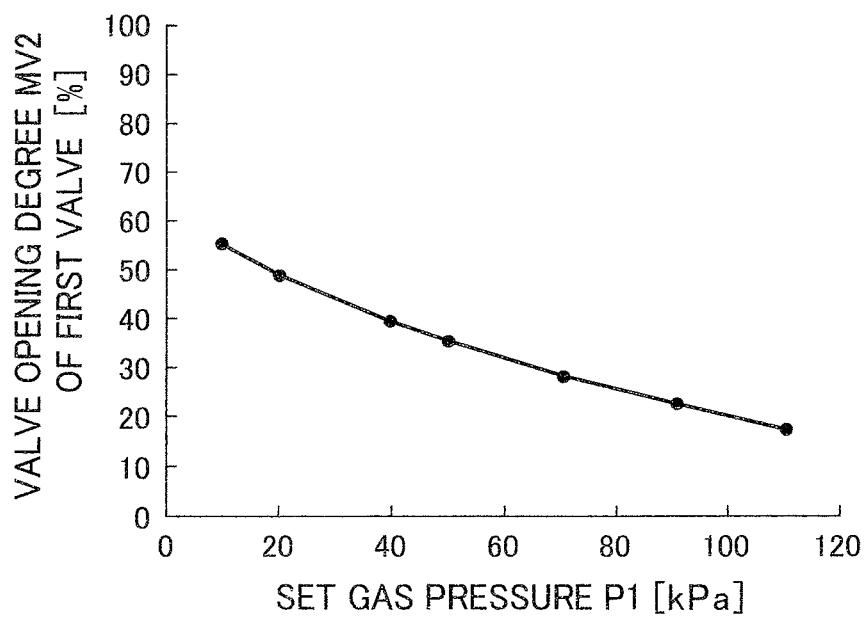
Figure 5:
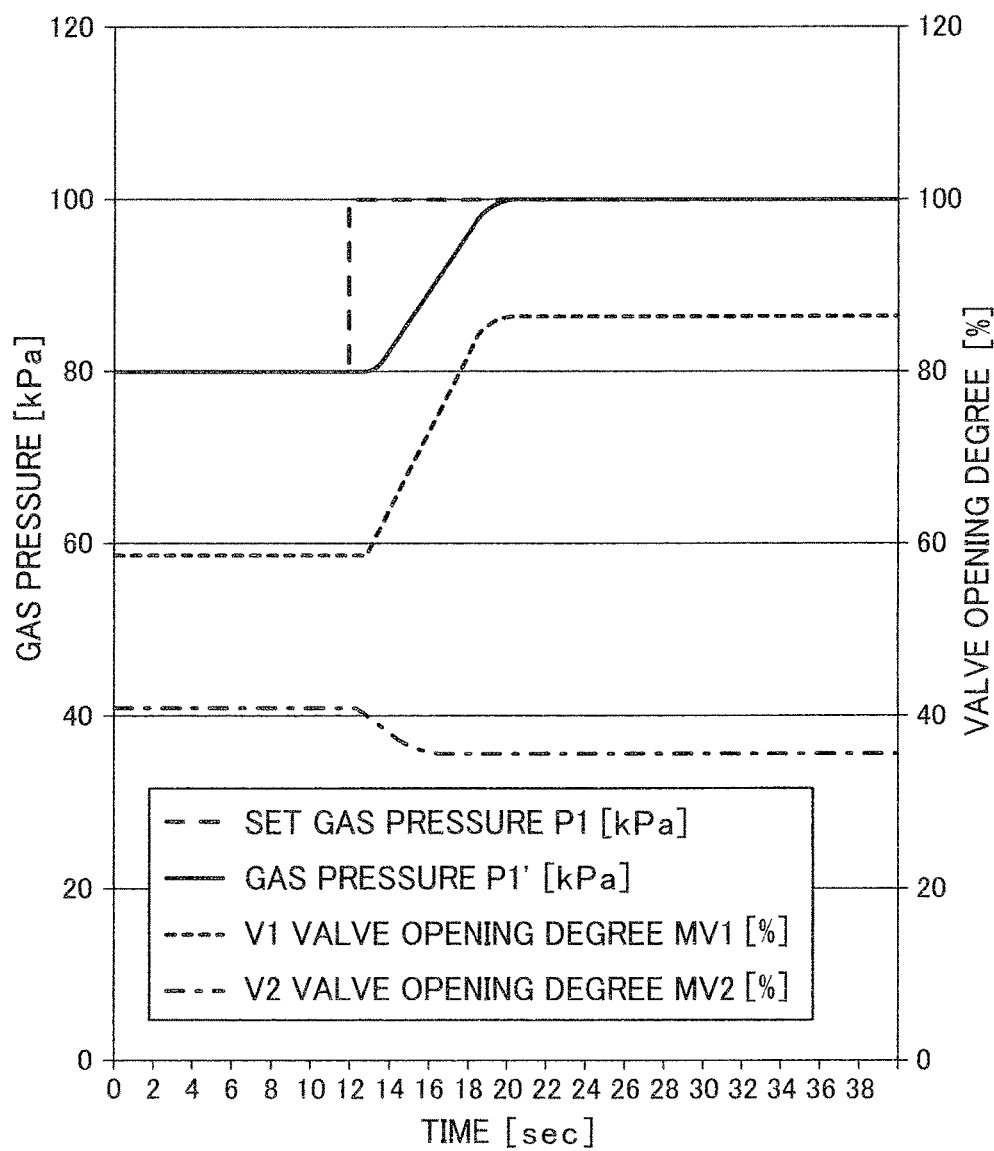
FIG. 5 is a graph depicting an amount of change in pressure actual value over time in the case where the device for controlling the amount of hot dip galvanization adhesion in Embodiment 2 of the present invention is used.

The device for controlling the amount of hot dip galvanization adhesion in Embodiment 2 of the present invention is described below by using FIGS. 3, 4, and 5. FIG. 3 is a schematic view explaining the device for controlling the amount of hot dip galvanization adhesion in Embodiment 2 of the present invention. FIG. 4 includes graphs of an example of the table which is included in a computation processing unit in Embodiment 2 of the present invention and which depicts the relationships between the set gas pressure and the valve opening degree of each of the first valve and the second valve. Part (a) of FIG. 4 is a graph depicting relationships between the set gas pressure P1 and the valve opening degree MV1 [%] of the first valve. Part (b) of FIG. 4 is a graph depicting relationships between the set gas pressure P1 and the valve opening degree MV2 [%] of the second valve. FIG. 5 is a graph depicting an amount of change in pressure actual value over time in the case where the device for controlling the amount of hot dip galvanization adhesion in Embodiment 2 of the present invention is used.

As depicted in FIG. 3, the device for controlling the amount of hot dip galvanization adhesion in Embodiment 2 of the present invention includes a wiping pressure setting unit 11, a computation processing unit (data storage unit for the valve opening degree table) 31, a first valve opening degree setter 13, a second valve opening degree setter 14, a gas supply device 15, a receiver tank 16, the first valve 17, the second valve 18, a first pressure gauge 19, a second pressure gauge 20, a third pressure gauge 21, a first wiping nozzle 22, and a second wiping nozzle 23. Note that the solid-line arrows in the drawing indicate a duct through which gas flows.

Since the duct through which the gas flows, the wiping pressure setting unit 11, the first valve opening degree setter 13, the second valve opening degree setter 14, the gas supply device 15, the receiver tank 16, the first valve 17, the second valve 18, the first pressure gauge 19, the second pressure gauge 20, the third pressure gauge 21, the first wiping nozzle 22, and the second wiping nozzle 23 in the device for controlling the amount of hot dip galvanization adhesion in Embodiment 2 of the present invention are the same as those in the already-described device for controlling the amount of hot dip galvanization adhesion in Embodiment 1 of the present invention, description thereof is omitted.

Note that, in the device for controlling the amount of hot dip galvanization adhesion in Embodiment 2 of the present invention, it is assumed that gas spraying amounts of the first wiping nozzle 22 and the second wiping nozzle 23 are equal and gas pressures thereof are equal.

The computation processing unit (data storage unit for the valve opening degree table) 31 has a table indicating relationships between the set gas pressure P1 set by the wiping pressure setting unit 11 and each of the valve opening degrees MV1, MV2 of the first valve 17 and the second valve 18.

Moreover, the computation processing unit (data storage unit for the valve opening degree table) 31 derives, from the table, the valve opening degree MV1 of the first valve 17 at which the gas pressure P1' of the wiping nozzles 22, 23 becomes equal to the set gas pressure P1 set by the wiping pressure setting unit 11, based on the table, and instructs the first valve opening degree setter 13 about the obtained valve opening degree MV1. Moreover, the computation processing unit 31 derives, from the table, the valve opening degree MV2 of the second valve 18 at which the sum of a gas flow rate (wiping gas flow rate) Q1 of the gas supplied to the first wiping nozzle 22 and the second wiping nozzle 23 and a gas flow rate Q2 of the gas diffused from the second valve 18 to the outside of the system, that is a total gas flow rate QT of the gas supplied from the gas supply device 15 is constant, and instructs the second valve opening degree setter 14 about the obtained valve opening degree MV2. The valve opening degrees of the first valve 17 and the second valve 18 are thereby preset.

The graphs of the example of the table are depicted in parts (a) and (b) of FIG. 4. In the graph depicted in part (a) of FIG. 4, the vertical axis represents the valve opening degree MV1 [%] of the first valve 17, and the horizontal axis represents the set gas pressure P1 [kPa]. In the graph depicted in part (b) of FIG. 4, the vertical axis represents the valve opening degree MV2 [%] of the second valve 18, and the horizontal axis represents the set gas pressure P1 [kPa]. As depicted in these graphs, the higher the set gas pressure P1 is, the higher the valve opening degree MV1 is set, and the lower the valve opening degree MV2 is set to make the total gas flow rate QT constant.

The device for controlling the amount of hot dip galvanization adhesion in Embodiment 2 of the present invention which has the configuration described above can perform preset control of the first valve 17 and the second valve 18, based on the table.

Embodiment 3

A device for controlling an amount of hot dip galvanization adhesion in Embodiment 3 of the present invention is partially changed from the device for controlling the amount of hot dip galvanization adhesion in Embodiment 1, and valves are installed respectively for a first wiping nozzle 22 and a second wiping nozzle 23. Note that it is assumed that gas spraying amounts of the first wiping nozzle 22 and the second wiping nozzle 23 are equal and gas pressures thereof are equal.

Figure 6:
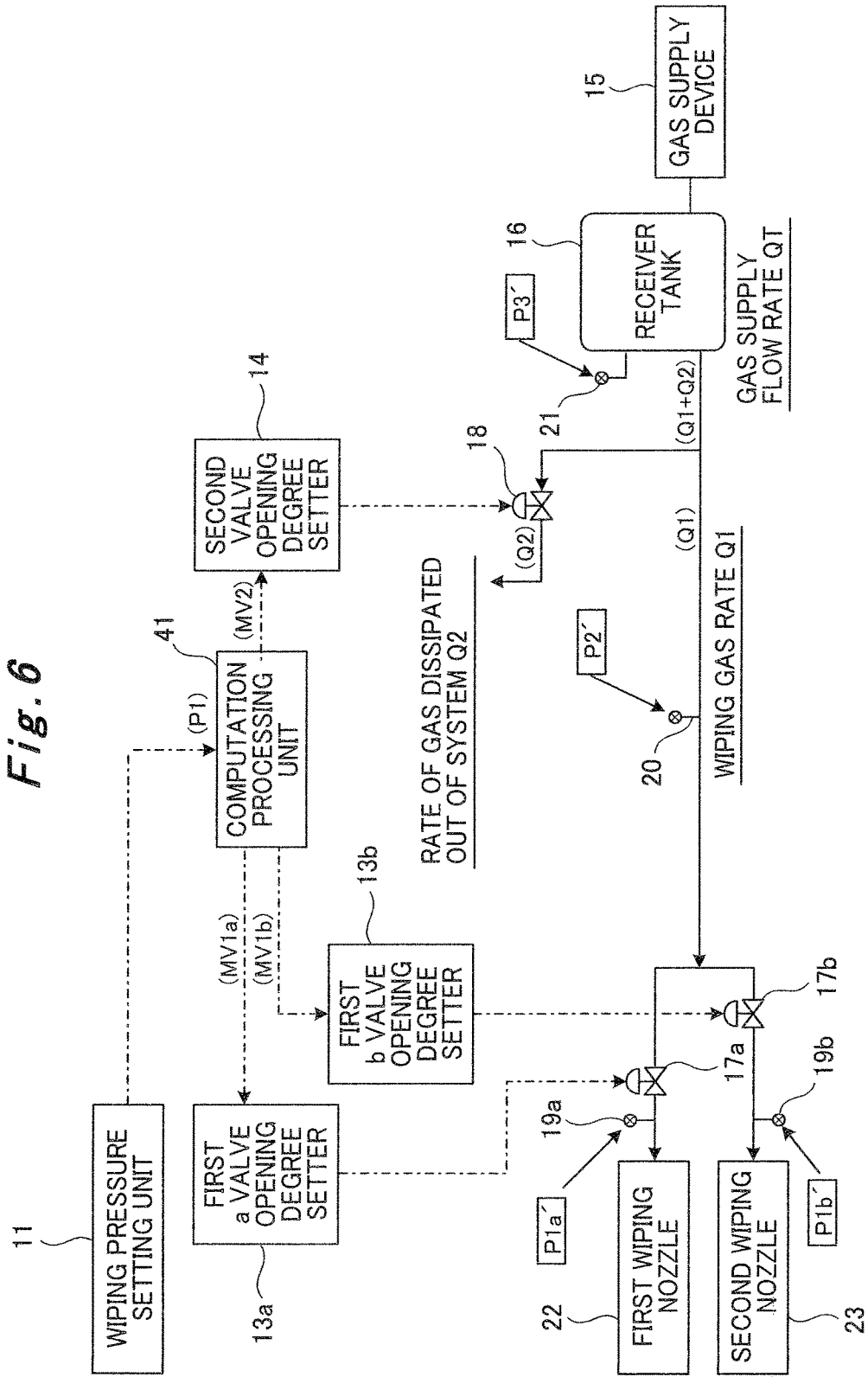
FIG. 6 is a schematic view explaining a device for controlling an amount of hot dip galvanization adhesion in Embodiment 3 of the present invention.
Figure 7:
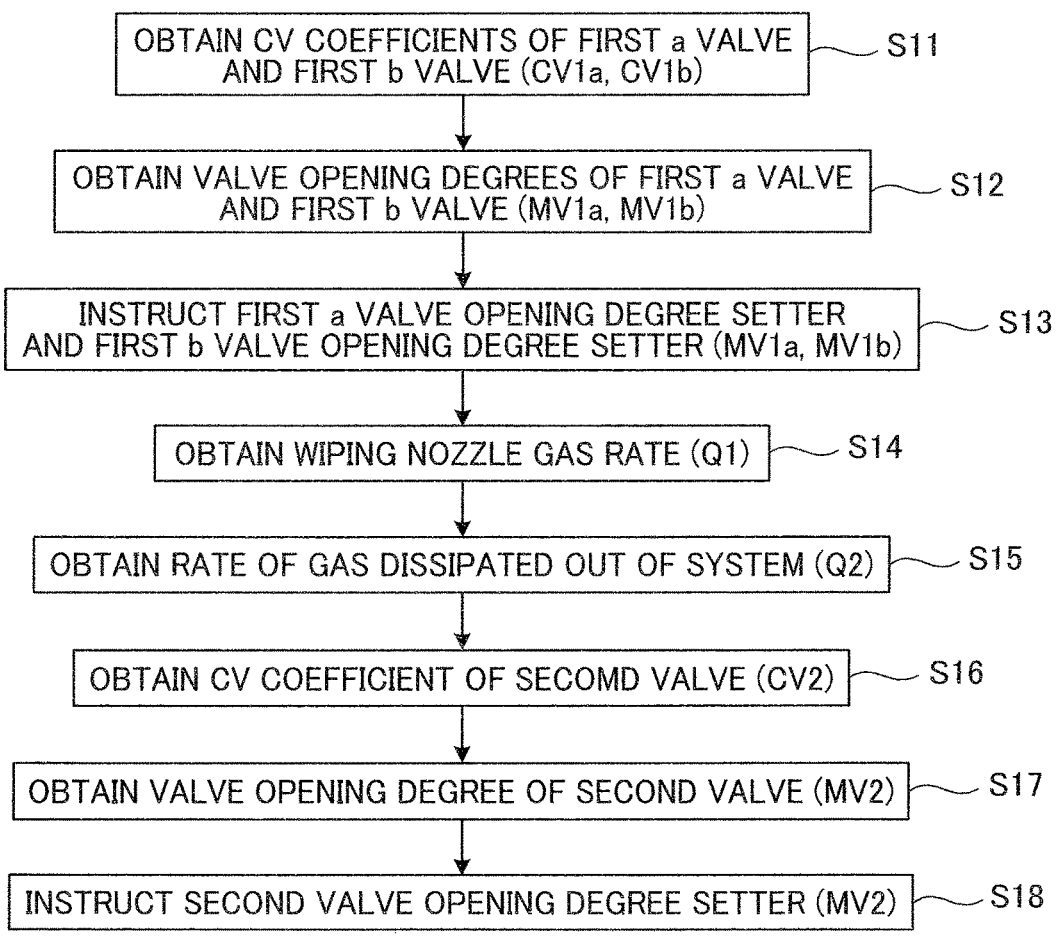
FIG. 7 is a flowchart explaining processing of a computation processing unit in Embodiment 3 of the present invention.

The device for controlling the amount of hot dip galvanization adhesion in Embodiment 3 of the present invention is described below by using FIGS. 6 and 7. FIG. 6 is a schematic view explaining the device for controlling the amount of hot dip galvanization adhesion in Embodiment 3 of the present invention. FIG. 7 is a flowchart describing processing of a computation processing unit in Embodiment 3 of the present invention.

As depicted in FIG. 6, the device for controlling the amount of hot dip galvanization adhesion in Embodiment 3 of the present invention includes a wiping pressure setting unit 11, a computation processing unit 41, a first a valve opening degree setter 13a, a first b valve opening degree setter 13b, a second valve opening degree setter 14, a gas supply device 15, a receiver tank 16, a first a valve 17a, a first b valve 17b, a second valve 18, a first a pressure gauge 19a, a first b pressure gauge 19b, a second pressure gauge 20, a third pressure gauge 21, the first wiping nozzle 22, and the second wiping nozzle 23. Note that the solid-line arrows in the drawing indicate a duct through which gas flows.

Since the duct through which the gas flows, the wiping pressure setting unit 11, the second valve opening degree setter 14, the gas supply device 15, the receiver tank 16, the second valve 18, the second pressure gauge 20, the third pressure gauge 21, the first wiping nozzle 22, and the second wiping nozzle in the device for controlling the amount of hot dip galvanization adhesion in Embodiment 3 of the present invention are the same as those in the already-described device for controlling the amount of hot dip galvanization adhesion in Embodiment 1 of the present invention, description thereof is omitted.

The first a valve 17a is installed upstream of the first wiping nozzle 22 and controls an actual gas pressure P1a' of the first wiping nozzle 22.

The first b valve 17b is installed upstream of the second wiping nozzle 23 and controls an actual gas pressure P1b' of the second wiping nozzle 23.

The first a pressure gauge 19a measures an actual gas pressure in the duct between the first a valve 17a and the first wiping nozzle 22, that is the actual gas pressure P1a' of the first wiping nozzle 22.

The first b pressure gauge 19b measures an actual gas pressure in the duct between the first b valve 17b and the second wiping nozzle 23, that is the actual gas pressure P1b' of the second wiping nozzle 23.

The computation processing unit 41 obtains a valve opening degree MV1a [%] of the first a valve 17a and a valve opening degree MV1b [%] of the first b valve 17b at which the gas pressure P1a' and the gas pressure P1b' become equal to a set gas pressure P1, and instructs the first a valve opening degree setter 13a and the first b valve opening degree setter 13b about the obtained valve opening degrees MV1a, MV1b, respectively. Moreover, the computation processing unit 41 obtains a valve opening degree MV2 of the second valve 18 at which a total gas flow rate QT is constant, and instructs the second valve opening degree setter 14 about the obtained valve opening degree MV2. The valve opening degrees of the first a valve 17a, the first b valve 17b, and the second valve 18 are thereby preset. Operations of the computation processing unit 41 are described below in detail by using FIG. 7.

In step S11, a CV coefficient of the first a valve 17a and a CV coefficient of the first b valve 17b are obtained based on the set gas pressure P1 set by the wiping pressure setting unit 11, by using the following formula (7):

$$CV1a = CV1b = Kv/((P3'-P1)^{1/2}/P1^{1/2}) \qquad (7)$$

where CV1a is the CV coefficient of the first a valve 17a and CV1b is the CV coefficient of the first b valve 17b.

In steps S12 and S13, the valve opening degree MV1a of the first a valve 17a at which the gas pressure P1a' becomes equal to the set gas pressure P1 is calculated by using the following formula (8) (empirical formula), and the valve opening degree MV1b of the first b valve 17b at which the gas pressure P1b' becomes equal to the set gas pressure P1 is calculated by using the following formula (9) (empirical formula). Then, the valve opening degrees MV1a, MV1b are outputted (instructed) to the first a valve opening degree setter 13a and the first b valve opening degree setter 13b.

$$MV1a = \text{Function}_{1a}[CV1a] \qquad (8)$$

$$MV1b = \text{Function}_{1b}[CV1b] \qquad (9)$$

where $\text{Function}_{1a}$ is a characteristic function unique to the first a valve 17a and $\text{Function}_{1b}$ is a characteristic function unique to the first b valve 17b.

In step S14, a wiping gas flow rate Q1 is calculated by using the following formula (10):

$$Q1 = (Kva \times P1^{1/2}) + (Kvb \times P1^{1/2}) \tag{10}$$

In step S15, a gas flow rate Q2 of the gas diffused out of the system is calculated by using the aforementioned formula (4).

In step S16, a CV coefficient of the second valve 18 is calculated by using the aforementioned formula (5).

In steps S17 and S18, the valve opening degree MV2 of the second valve 18 at which the total gas flow rate QT is constant is calculated by using the aforementioned formula (6) (empirical formula), and is outputted (instructed) to the second valve opening degree setter 14.

These are the operations of the computation processing unit 12.

The first a valve opening degree setter 13a sets the valve opening degree of the first a valve 17a, based on MV1a received from the computation processing unit 41.

The first b valve opening degree setter 13b sets the valve opening degree of the first b valve 17b, based on MV1b inputted from the computation processing unit 41.

In the device for controlling the amount of hot dip galvanization adhesion in Embodiment 3 of the present invention which has the configuration described above, the first a valve 17a and the first b valve 17b are installed respectively for the first wiping nozzle 22 and the second wiping nozzle 23, and preset control of the opening degrees of the respective valves can be performed.

Embodiment 4

A device for controlling an amount of hot dip galvanization adhesion in Embodiment 4 of the present invention is partially changed from the device for controlling the amount of hot dip galvanization adhesion in Embodiment 1, and a setting of a valve opening degree of a first valve 17 by a first valve opening degree setter 13 can be corrected.

Figure 8:
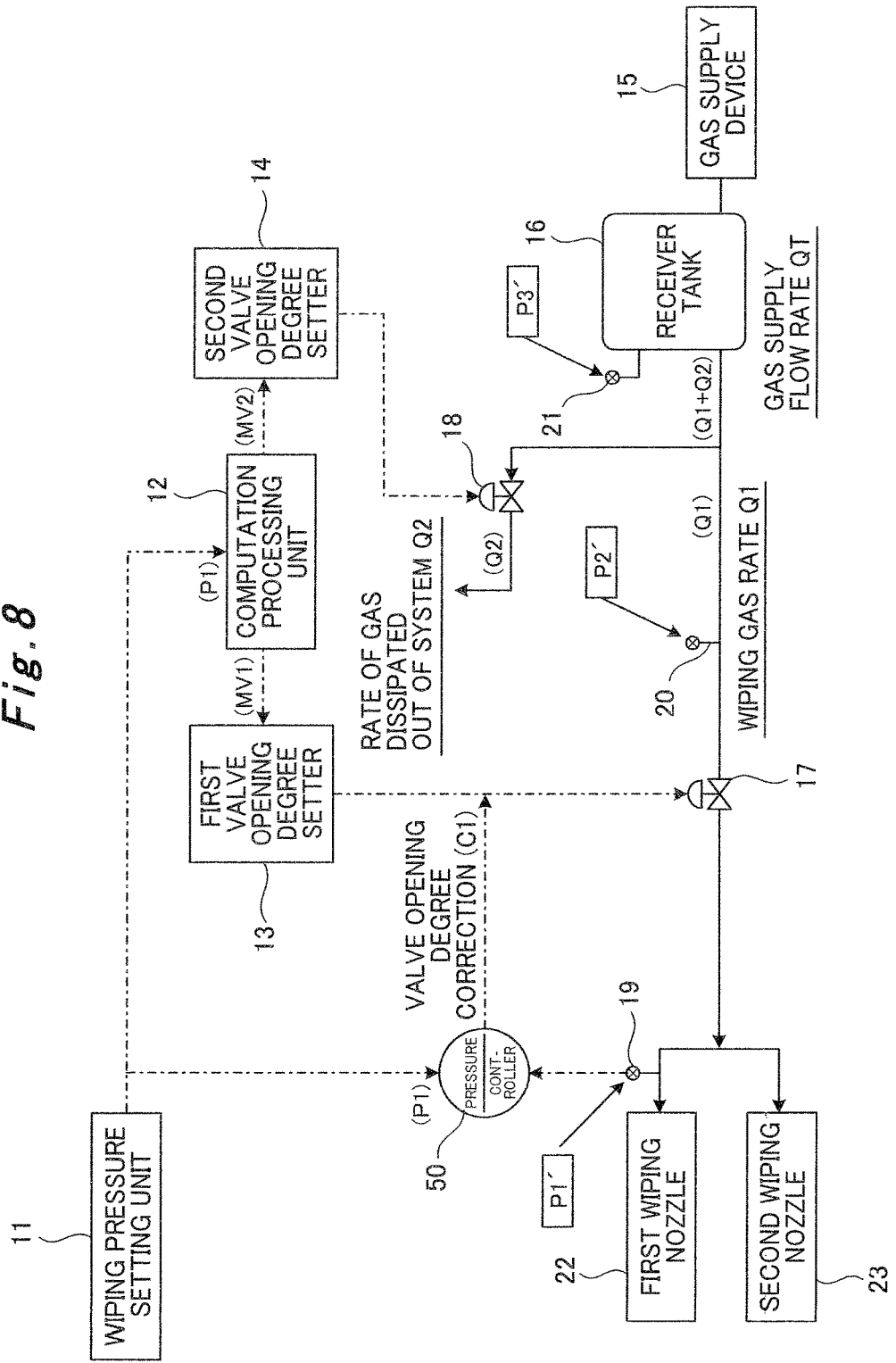
FIG. 8 is a schematic view explaining a device for controlling an amount of hot dip galvanization adhesion in Embodiment 4 of the present invention.

The device for controlling the amount of hot dip galvanization adhesion in Embodiment 4 of the present invention is described below by using FIG. 8. FIG. 8 is a schematic view explaining the device for controlling the amount of hot dip galvanization adhesion in Embodiment 4 of the present invention.

As depicted in FIG. 8, the device for controlling the amount of hot dip galvanization adhesion in Embodiment 4 of the present invention includes a wiping pressure setting unit 11, a computation processing unit 12, the first valve opening degree setter 13, a second valve opening degree setter 14, a gas supply device 15, a receiver tank 16, the first valve 17, a second valve 18, a first pressure gauge 19, a second pressure gauge 20, a third pressure gauge 21, a first wiping nozzle 22, a second wiping nozzle 23, and a pressure controller 50. Note that the solid-line arrows in the drawing indicate a duct through which gas flows.

Since the duct through which the gas flows, the wiping pressure setting unit 11, the computation processing unit 12, the first valve opening degree setter 13, the second valve opening degree setter 14, the gas supply device 15, the receiver tank 16, the first valve 17, the second valve 18, the first pressure gauge 19, the second pressure gauge 20, the third pressure gauge 21, the first wiping nozzle 22, and the second wiping nozzle 23 in the device for controlling the amount of hot dip galvanization adhesion in Embodiment 4 of the present invention are the same as those in the already-described device for controlling the amount of hot dip galvanization adhesion in Embodiment 1 of the present invention, description thereof is omitted.

Note that, in the device for controlling the amount of hot dip galvanization adhesion in Embodiment 4 of the present invention, it is assumed that gas spraying amounts of the first wiping nozzle 22 and the second wiping nozzle 23 are equal and gas pressures thereof are equal.

The pressure controller 50 calculates a valve opening degree correction value C1 [%] from a pressure difference between a set gas pressure P1 and an actual gas pressure P1' as shown in the following formula (11). Then, the pressure controller 50 sets the valve opening degree of the first valve 17 set by the first valve opening degree setter 13 to MV1+C1 [%].

$$C1 = f_1(P1 - P1') \tag{11}$$

The device for controlling the amount of hot dip galvanization adhesion in Embodiment 4 of the present invention which has the configuration described above can perform correction for the preset-controlled first valve 17, based on the actual measured value.

Embodiment 5

A device for controlling an amount of hot dip galvanization adhesion in Embodiment 5 of the present invention is partially changed from the device for controlling the amount of hot dip galvanization adhesion in Embodiment 3, and settings of a valve opening degree of a first a valve 17a and a valve opening degree of a first b valve 17b can be corrected.

Figure 9:
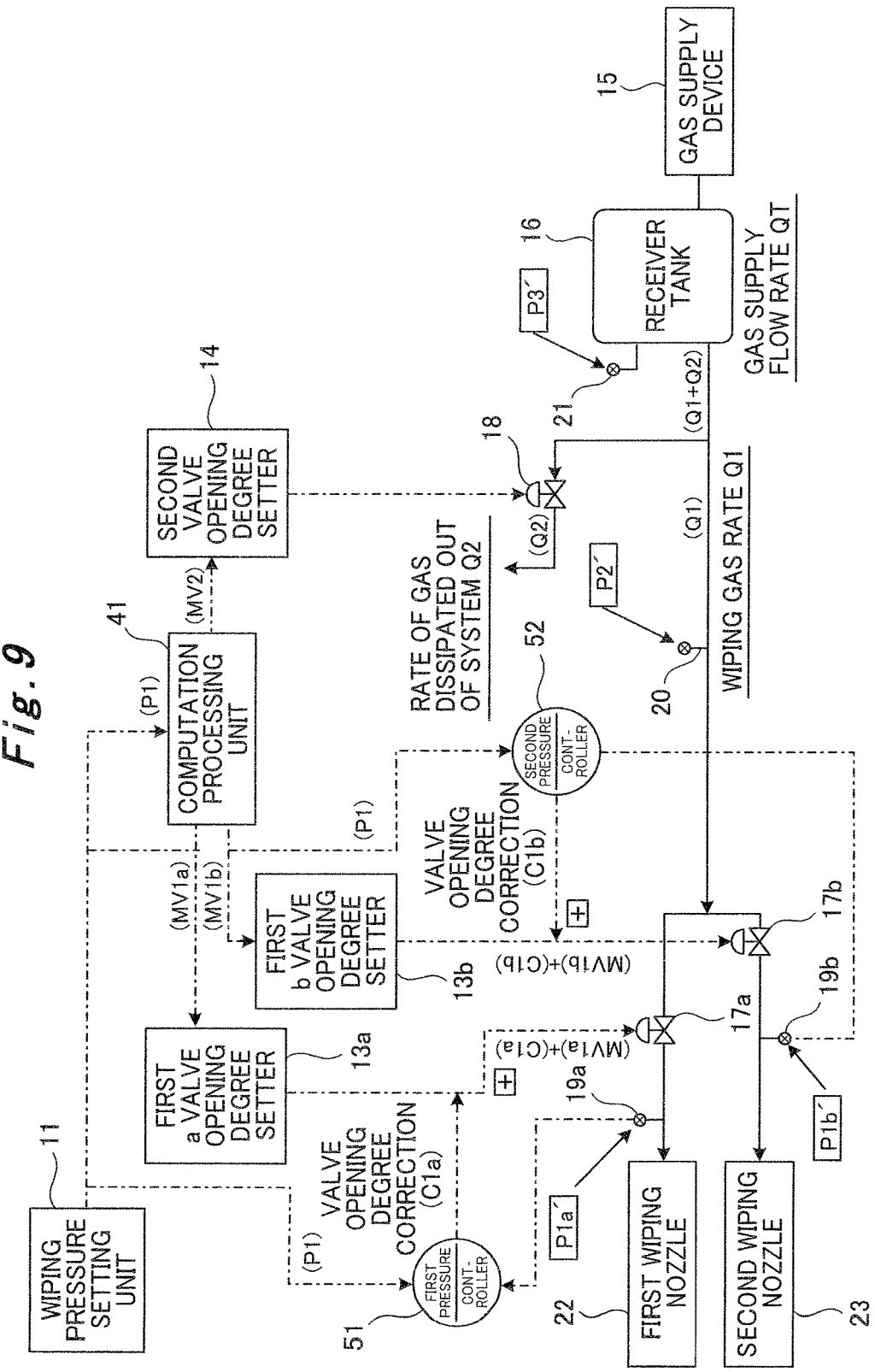
FIG. 9 is a schematic view explaining a device for controlling an amount of hot dip galvanization adhesion in Embodiment 5 of the present invention.

The device for controlling the amount of hot dip galvanization adhesion in Embodiment 5 of the present invention is described below by using FIG. 9. FIG. 9 is a schematic view explaining the device for controlling the amount of hot dip galvanization adhesion in Embodiment 5 of the present invention.

As depicted in FIG. 9, the device for controlling the amount of hot dip galvanization adhesion in Embodiment 5 of the present invention includes a wiping pressure setting unit 11, a computation processing unit 41, a first a valve opening degree setter 13a, a first b valve opening degree setter 13b, a second valve opening degree setter 14, a gas supply device 15, a receiver tank 16, the first a valve 17a, the first b valve 17b, a second valve 18, a first a pressure gauge 19a, a first b pressure gauge 19b, a second pressure gauge 20, a third pressure gauge 21, a first wiping nozzle 22, a second wiping nozzle 23, a first pressure controller 51, and a second pressure controller 52. Note that the solid-line arrows in the drawing indicate a duct through which gas flows.

Since the duct through which the gas flows, the wiping pressure setting unit 11, the computation processing unit 41, the first a valve opening degree setter 13a, the first b valve opening degree setter 13b, the second valve opening degree setter 14, the gas supply device 15, the receiver tank 16, the first a valve 17a, the first b valve 17b, the second valve 18, the first a pressure gauge 19a, the first b pressure gauge 19b, the second pressure gauge 20, the third pressure gauge 21, the first wiping nozzle 22, and the second wiping nozzle 23 in the device for controlling the amount of hot dip galvanization adhesion in Embodiment 5 of the present invention are the same as those in the already-described device for controlling the amount of hot dip galvanization adhesion in Embodiment 3 of the present invention, description thereof is omitted.

The first pressure controller 51 calculates a valve opening degree correction value C1a [%] from a pressure difference between a set gas pressure P1 and an actual gas pressure P1a' of the first wiping nozzle 22 as shown in the following formula (12). Then, the first pressure controller 51 sets the valve opening degree of the first a valve 17a set by the first a valve opening degree setter 13a to MV1a+C1a [%].

$$C1a = f_2(P1-P1a') \tag{12}$$

The second pressure controller 52 calculates a valve opening degree correction value C1b [%] from a pressure difference between the set gas pressure P1 and an actual gas pressure P1b' of the second wiping nozzle 23 as shown in the following formula (13). Then, the second pressure controller 52 sets the valve opening degree of the first b valve 17b set by the first b valve opening degree setter 13b to MV1b+C1b [%].

$$C1b = f_3(P1-P1b') \tag{13}$$

In the device for controlling the amount of hot dip galvanization adhesion in Embodiment 5 of the present invention which has the configuration described above, the first a valve 17a and the first b valve 17b are installed respectively for the first wiping nozzle 22 and the second wiping nozzle 23, and preset control of the opening degrees of the respective valves is performed. Moreover, the correction can be performed for the preset-controlled first a valve 17a and first b valve 17b, based on the actual measured values.

Embodiment 6

A device for controlling an amount of hot dip galvanization adhesion in Embodiment 6 of the present invention is partially changed from the device for controlling the amount of hot dip galvanization adhesion in Embodiment 3. In the device for controlling the amount of hot dip galvanization adhesion in Embodiment 6 of the present invention, a wiping nozzle pressure setting unit includes a first wiping pressure setting unit 11a and a second wiping pressure setting unit 11b, and settings of a valve opening degree of a first a valve 17a and a valve opening degree of a first b valve 17b can be corrected.

Figure 10:
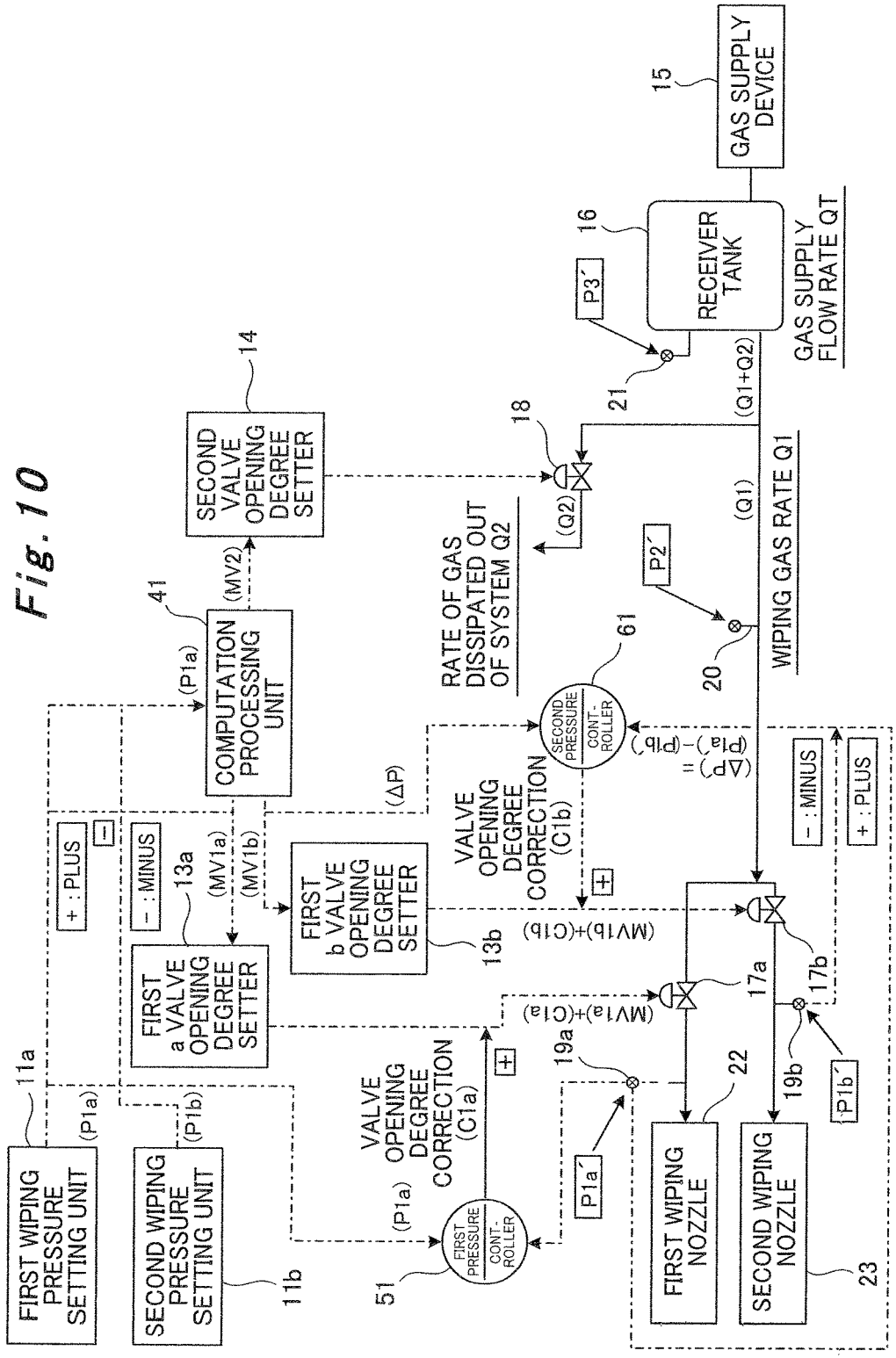
FIG. 10 is a schematic view explaining a device for controlling an amount of hot dip galvanization adhesion in Embodiment 6 of the present invention.

The device for controlling the amount of hot dip galvanization adhesion in Embodiment 6 of the present invention is described below by using FIG. 10. FIG. 10 is a schematic view explaining the device for controlling the amount of hot dip galvanization adhesion in Embodiment 6 of the present invention.

As depicted in FIG. 10, the device for controlling the amount of hot dip galvanization adhesion in Embodiment 6 of the present invention includes the first wiping pressure setting unit 11a, the second wiping pressure setting unit 11b, a computation processing unit 41, a first a valve opening degree setter 13a, a first b valve opening degree setter 13b, a second valve opening degree setter 14, a gas supply device 15, a receiver tank 16, the first a valve 17a, the first b valve 17b, a second valve 18, a first a pressure gauge 19a, a first b pressure gauge 19b, a second pressure gauge 20, a third pressure gauge 21, a first wiping nozzle 22, a second wiping nozzle 23, a first pressure controller 51, and a second pressure controller 61. Note that the solid-line arrows in the drawing indicate a duct through which gas flows.

Since the duct through which the gas flows, the computation processing unit 41, the first a valve opening degree setter 13a, the first b valve opening degree setter 13b, the second valve opening degree setter 14, the gas supply device 15, the receiver tank 16, the first a valve 17a, the first b valve 17b, the second valve 18, the first a pressure gauge 19a, the first b pressure gauge 19b, the second pressure gauge 20, the third pressure gauge 21, the first wiping nozzle 22, and the second wiping nozzle 23 in the device for controlling the amount of hot dip galvanization adhesion in Embodiment 6 of the present invention are the same as those in the already-described device for controlling the amount of hot dip galvanization adhesion in Embodiment 3 of the present invention, description thereof is omitted.

The first wiping pressure setting unit 11a sets a set gas pressure in the duct between the first a valve 17a and the first wiping nozzle 22, that is a set pressure P1a of the first wiping nozzle 22.

The second wiping pressure setting unit 11b sets a set gas pressure in the duct between the first b valve 17b and the second wiping nozzle 23, that is a set pressure P1b of the second wiping nozzle 23.

The computation processing unit 41 uses the set gas pressure P1a instead of the set gas pressure P1 used in Embodiment 3. Specifically, the computation processing unit 41 obtains a valve opening degree MV1a of the first a valve 17a at which a gas pressure P1a' becomes equal to the set gas pressure P1a, and instructs the first a valve opening degree setter 13a about the obtained valve opening degree MV1a. At the same time, the computation processing unit 41 obtains a valve opening degree MV1b of the first b valve 17b at which a gas pressure P1b' becomes equal to the set gas pressure P1b, and instructs the first b valve opening degree setter 13b about the obtained valve opening degree MV1b. Moreover, the computation processing unit 41 obtains a valve opening degree MV2 of the second valve 18 at which a total gas flow rate QT is constant, and instructs the second valve opening degree setter 14 about the obtained valve opening degree MV2. The valve opening degrees of the first a valve 17a, the first b valve 17b, and the second valve 18 are thereby preset. Note that a set gas pressure P1b is not used in the computation processing unit 41 (alternatively, the computation processing unit 41 may obtain gas flow rates Q1a, Q1b by using the set pressure P1b, where Q1=Q1a+Q1b, QT=Q1a+Q1b+Q2 are satisfied).

As in Embodiment 5, the first pressure controller 51 calculates a valve opening degree correction value C1a [%] from a pressure difference between a set gas pressure P1 and the gas pressure P1a' as shown in the aforementioned formula (11). Then, the first pressure controller 51 sets the valve opening degree of the first a valve 17a set by the first a valve opening degree setter 13a to MV1a+C1a [%].

The second pressure controller 61 calculates a valve opening degree correction value C1b from a pressure difference between ΔP and ΔP' (ΔP−ΔP'), where ΔP is a pressure difference between the set gas pressure P1a and the set gas pressure P1b (P1a−P1b) and ΔP' is a pressure difference between the gas pressure P1a' and the gas pressure P1b' (P1a'−P1b'). Then, the second pressure controller 61 sets the valve opening degree of the first b valve 17b set by the first b valve opening degree setter 13b to MV1b+C1b [%].

That is the description of the device for controlling the amount of hot dip galvanization adhesion in Embodiment 6 of the present invention. A method for controlling the amount of hot dip galvanization adhesion in Embodiment 6 of the present invention is described below.

In the method for controlling the amount of hot dip galvanization adhesion in Embodiment 6 of the present invention, the gas supplied from the gas supply device 15 is sprayed on a steel plate to which molten metal adheres, by using the first wiping nozzle 22 and the second wiping nozzle 23 which communicate with the gas supply device 15 via the duct.

Moreover, the actual gas pressure P1a' of the first wiping nozzle 22 is controlled by the first a valve 17a, and the actual gas pressure P1b' of the second wiping nozzle 23 is controlled by the first b valve 17b.

Furthermore, the aforementioned duct branches in two directions, and one branched portion of the duct communicates with the first wiping nozzle 22 and the second wiping nozzle 23 while the other branched portion of the duct is open. The gas flow rate Q2 of the gas to be diffused from the other branched portion of the duct to the outside of the system is controlled by the second valve 18.

Moreover, the set gas pressure P1a of the first wiping nozzle 22 and the set gas pressure P1b of the second wiping nozzle 23 are set.

Furthermore, the valve opening degree MV1a of the first a valve 17b is set such that the actual gas pressure P1a' becomes equal to the set gas pressure P1a, the valve opening degree MV1b of the first b valve 17b is set such that the actual gas pressure P1b' becomes equal to the set gas pressure P1b, and the valve opening degree MV2 of the second valve 18 is set such that the total gas flow rate QT is constant.

Moreover, the valve opening degree correction value C1a is calculated from the difference between the set gas pressure P1a and the actual gas pressure P1a', and control to add the valve opening degree correction value C1a to the valve opening degree MV1a is performed.

Furthermore, the valve opening degree correction value C1b is calculated from the difference between the pressure difference ΔP and the pressure difference ΔP', the pressure difference ΔP being the difference between the set gas pressure P1a and the set gas pressure P1b, the pressure difference ΔP' being the difference between the actual gas pressure P1a' and the actual gas pressure P1b'. Then, control to add the valve opening degree correction value C1b to the valve opening degree MV1b is performed.

These are the method for controlling the amount of hot dip galvanization adhesion in Embodiment 6 of the present invention. As described above, in the device and method for controlling the amount of hot dip galvanization adhesion in Embodiment 6 of the present invention, the preset control of the valve opening degrees of the first a valve 17a and the first b valve 17b is performed by the first wiping pressure setting unit 11a and the second wiping pressure setting unit 11b. Moreover, it is possible to perform correction for the preset-controlled first a valve 17a and first b valve 17b, based on the actual measured values, particularly perform correction for the first b valve 17b by using the pressure difference between ΔP and ΔP'.

The device and method for controlling the amount of hot dip galvanization adhesion of the present invention have been described by using Embodiments 1 to 6. The device and method for controlling the amount of hot dip galvanization adhesion of the present invention can achieve control accuracy high enough to reduce variation in the amount of galvanization adhesion and a response performance fast enough to complete change of the amount of galvanization adhesion in short time.

INDUSTRIAL APPLICABILITY

The present invention is preferable as a device and method for controlling an amount of hot dip galvanization adhesion.

EXPLANATION OF THE REFERENCE NUMERALS 11 wiping pressure setting unit
12, 41 computation processing unit
13 first valve opening degree setter
13a first a valve opening degree setter
13b first b valve opening degree setter
14 second valve opening degree setter
15 gas supply device
16 receiver tank
17 first valve
18 second valve
19 first pressure gauge
20, 120 second pressure gauge
21, 121 third pressure gauge
22, 122 first wiping nozzle
23, 123 second wiping nozzle
31 computation processing unit (data storage unit for valve opening degree table)
50 pressure controller
51 first pressure controller
52, 61 second pressure controller
113a first valve opening degree setter
113b second valve opening degree setter
115 gas supply device
116 receiver tank
117a first pressure control valve
117b second pressure control valve
118 opening control valve
119a first a pressure gauge
119b first b pressure gauge

The invention claimed is:

1. A device for controlling an amount of hot dip galvanization adhesion, the device comprises:
    a nozzle communicating with a gas supply device via a duct and configured to spray gas supplied from the gas supply device onto a steel plate to which molten metal adheres;
    the duct branching in two directions and having a first branched portion communicating with the nozzle and a second branched portion being open;
    a first valve configured to control an actual gas pressure P1' of the nozzle;
    a second valve configured to control a gas flow rate Q2 of the gas to be diffused from the second branched portion of the duct to an outside of a system;
    a pressure setting unit configured to set a set gas pressure P1 of the nozzle;
    a first valve opening degree setter configured to set a valve opening degree MV1 of the first valve, based on an instruction from a computation processing unit;
    a second valve opening degree setter configured to set a valve opening degree MV2 of the second valve, based on an instruction from the computation processing unit;
    the computation processing unit configured to obtain the valve opening degree MV1 at which the gas pressure P1' becomes equal to the set gas pressure P1, and instruct the first valve opening degree setter about the obtained valve opening degree MV1, the computation processing unit configured to obtain the valve opening degree MV2 at which a total gas flow rate QT of the gas supplied from the gas supply device is constant, and instruct the second valve opening degree setter about the obtained valve opening degree MV2.

2. The device for controlling an amount of hot dip galvanization adhesion according to claim 1, wherein:

the valve opening degree MV1 and valve opening degree MV2 are obtained by the configuration of the computational processing unit to:
calculate a CV coefficient CV1 of the first valve from the set gas pressure P1, an actual gas pressure P3' supplied from the gas supply device, and a pressure loss coefficient of the nozzle;
calculate the valve opening degree MV1 from the CV coefficient CV1 and a characteristic function unique to the first valve;
calculate the gas flow rate Q1 from the set gas pressure P1 and the pressure loss coefficient;
calculate the gas flow rate Q2 from the gas flow rate Q1 and the total gas flow rate QT determined in advance from an ability of the gas supply device;
calculate a CV coefficient CV2 of the second valve from the gas flow rate Q2 and the gas pressure P3'; and
calculates the valve opening degree MV2 from the CV coefficient CV2 and a characteristic function unique to the second valve.

3. The device for controlling an amount of hot dip galvanization adhesion according to claim 1, wherein the computation processing unit has a table indicating relationships between the set gas pressure P1 and each of the valve opening degree MV1 and the valve opening degree MV2, and obtains the valve opening degree MV1 and the valve opening degree MV2 based on the table.

4. The device for controlling an amount of hot dip galvanization adhesion according to claim 1, wherein
the nozzle includes a first nozzle and a second nozzle,
the first valve includes a first a-valve configured to control an actual gas pressure P1a' of the first nozzle and a first b-valve configured to control an actual gas pressure P1b' of the second nozzle,
the first valve opening degree setter includes a first a-valve opening degree setter configured to set a valve opening degree MV1a of the first a-valve and a first b-valve opening degree setter configured to set a valve opening degree MV1b of the first b-valve, and
the computation processing unit:
obtains the valve opening degree MV1a and the valve opening degree MV1b at which the gas pressure P1a' and the gas pressure P1b' become equal to the set gas pressure P1, and instructs the first a-valve opening degree setter and the first b-valve opening degree setter about the obtained valve opening degree MV1a and the obtained valve opening degree MV1b; and
obtains the valve opening degree MV2 at which the total gas flow rate QT is constant, and instructs the second valve opening degree setter about the obtained valve opening degree MV2.

5. The device for controlling an amount of hot dip galvanization adhesion according to claim 4, wherein:
the valve opening degree MV1 and valve opening degree MV2 are obtained by the configuration of the computational processing unit to:
calculate a CV coefficient CV1a of the first a-valve and a CV coefficient CV1b of the first b-valve from the set gas pressure P1, an actual gas pressure P3' supplied from the gas supply device, and a pressure loss coefficient of the nozzle;
calculate the valve opening degree MV1a from the CV coefficient CV1a and a characteristic function unique to the first a-valve and calculates the valve opening degree MV1b from the CV coefficient CV1b and a characteristic function unique to the first b-valve;
calculate the gas flow rate Q1 from the set gas pressure P1 and the pressure loss coefficient;
calculate the gas flow rate Q2 from the gas flow rate Q1 and the total gas flow rate QT determined in advance from an ability of the gas supply device;
calculate a CV coefficient CV2 of the second valve from the gas flow rate Q2 and the gas pressure P3'; and
calculate the valve opening degree MV2 from the CV coefficient CV2 and a characteristic function unique to the second valve.

6. The device for controlling an amount of hot dip galvanization adhesion according to claim 1, wherein the device further comprises a pressure controller configured to calculate a valve opening degree correction value C1 from a difference between the set gas pressure P1 and the actual gas pressure P1' of the nozzle and perform control to add the valve opening degree correction value C1 to the valve opening degree MV1 set by the first valve opening degree setter.

7. The device for controlling an amount of hot dip galvanization adhesion according to claim 4, wherein the device further comprises:
a first pressure controller configured to calculate a valve opening degree correction value C1a from a difference between the set gas pressure P1 and the actual gas pressure P1a' of the nozzle and perform control to add the valve opening degree correction value C1a to the valve opening degree MV1a set by the first a-valve opening degree setter; and
a second pressure controller configured to calculate a valve opening degree correction value C1b from a difference between the set gas pressure P1 and the actual gas pressure P1b' of the nozzle and perform control to add the valve opening degree correction value C1b to the valve opening degree MV set by the first b-valve opening degree setter.

8. The device for controlling an amount of hot dip galvanization adhesion according to claim 4, wherein
the pressure setting unit includes a first pressure setting unit configured to set a set gas pressure P1a of the first nozzle and a second pressure setting unit configured to set a set gas pressure P1b of the second nozzle,
the computation processing unit:
obtains the valve opening degree MV1a and the valve opening degree MV at which the gas pressure P1a' and the gas pressure P1b' become equal to the set gas pressure P1a, and instructs the first a-valve opening degree setter and the first b-valve opening degree setter about the obtained valve opening degree MV1a and the obtained valve opening degree MV1b; and
obtains the valve opening degree MV2 at which the total gas flow rate QT is constant, and instructs the second valve opening degree setter about the obtained valve opening degree MV2, and
the device further comprises:
a first pressure controller configured to calculate a valve opening degree correction value C1a from a difference between the set gas pressure P1a and the actual gas pressure P1a' of the nozzle and perform control to add the valve opening degree correction value C1a to the valve opening degree MV1a set by the first a-valve opening degree setter; and
a second pressure controller configured to calculate a valve opening degree correction value C1b from a difference between a pressure difference ΔP and a pressure difference ΔP' and perform control to add the valve opening degree correction value C1$b$ to the valve opening degree MV1$b$, the pressure difference ΔP being a difference between the set gas pressure P1$a$ and the set gas pressure P1$b$, the pressure difference ΔP' being a difference between the gas pressure P1$a$' and the gas pressure P1$b$'.

9. A method for controlling an amount of hot dip galvanization adhesion, the method comprises the steps of:
spraying gas supplied from a gas supply device onto a steel plate to which molten metal adheres, by using a first nozzle and a second nozzle which communicate with the gas supply device via a duct;
controlling an actual gas pressure P1$a$' of the first nozzle by using a first a-valve and controlling an actual gas pressure P1$b$' of the second nozzle by using a first b-valve;
with the duct branching in two directions and having a first branched portion communicating with the first nozzle and the second nozzle and a second branched portion being open, controlling a gas flow rate Q2 of the gas diffused from the second branched portion of the duct to an outside of a system;
setting a set gas pressure P1$a$ of the first nozzle;
setting a set gas pressure P1$b$ of the second nozzle;
setting a valve opening degree MV1$a$ of the first a-valve such that the gas pressure P1$a$' becomes equal to the set gas pressure P1$a$, setting a valve opening degree MV1$b$ of the first b-valve such that the gas pressure P1$b$' becomes equal to the set gas pressure P1$b$, and setting a valve opening degree MV2 of the second valve such that the total gas flow rate QT is constant;
calculating a valve opening degree correction value C1$a$ from a difference between the set gas pressure P1$a$ and the gas pressure P1$a$' and performing control to add the valve opening degree correction value C1$a$ to the valve opening degree MV1$a$; and
calculating a valve opening degree correction value C1$b$ from a difference between a pressure difference ΔP and a pressure difference ΔP' and performing control to add the valve opening degree correction value C1$b$ to the valve opening degree MV1$b$, the pressure difference ΔP being a difference between the set gas pressure P1$a$ and the set gas pressure P1$b$, the pressure difference ΔP' being a difference between the gas pressure P1$a$' and the gas pressure P1$b$'.

10. The device for controlling an amount of hot dip galvanization adhesion according to claim 2, wherein the device further comprises a pressure controller configured to calculate a valve opening degree correction value C1 from a difference between the set gas pressure P1 and the actual gas pressure P1' of the nozzle and perform control to add the valve opening degree correction value C1 to the valve opening degree MV1 set by the first valve opening degree setter.

11. The device for controlling an amount of hot dip galvanization adhesion according to claim 3, wherein the device further comprises a pressure controller configured to calculate a valve opening degree correction value C1 from a difference between the set gas pressure P1 and the actual gas pressure P1' of the nozzle and perform control to add the valve opening degree correction value C1 to the valve opening degree MV1 set by the first valve opening degree setter.

12. The device for controlling an amount of hot dip galvanization adhesion according to claim 5, wherein the device further comprises:
a first pressure controller configured to calculate a valve opening degree correction value C1$a$ from a difference between the set gas pressure P1 and the actual gas pressure P1$a$' of the nozzle and perform control to add the valve opening degree correction value C1$a$ to the valve opening degree MV set by the first a valve opening degree setter; and
a second pressure controller configured to calculate a valve opening degree correction value C1$b$ from a difference between the set gas pressure P1 and the actual gas pressure P1$b$' of the nozzle and perform control to add the valve opening degree correction value C1$b$ to the valve opening degree MV1$b$ set by the first b valve opening degree setter.

\* \* \* \* \*